(12) United States Patent
Perani

(10) Patent No.: US 6,262,745 B1
(45) Date of Patent: *Jul. 17, 2001

(54) DIGITAL HALFTONING USING PRIORITIZED TEXTURES

(75) Inventor: Michael J. Perani, San Rafael, CA (US)

(73) Assignee: Adobe Systems Incorporated, San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,286

(22) Filed: Dec. 19, 1997

Related U.S. Application Data

(60) Provisional application No. 60/035,504, filed on Jan. 15, 1997.

(51) Int. Cl.[7] ............... G06T 11/40; G06K 9/40
(52) U.S. Cl. ............................... 345/432; 382/274
(58) Field of Search ................... 345/127, 129, 345/130, 131, 429, 430, 432; 382/274

(56) References Cited

U.S. PATENT DOCUMENTS

| 5,235,435 | 8/1993 | Schiller | 358/456 |
| 5,285,291 | 2/1994 | Schiller | 358/453 |
| 5,305,118 | 4/1994 | Schiller et al. | 358/456 |
| 5,594,853 | 1/1997 | Salesin et al. | 395/141 |
| 5,847,712 | * 12/1998 | Salesin et al. | 345/430 |

FOREIGN PATENT DOCUMENTS

| 8-5513 | * 2/1996 | (JP) | 17/30 |

OTHER PUBLICATIONS

"Digital Halftoning Using Prioritized Textures," 10 pgs, Submitted to Siggraph Jan. 14, 1997, by Michael Perori et al.

Jones, "Evolution of halftoning technology in the United States patent Literature," Journal of Electronic Imaging, Jul. 1994, vol. 3, No. 3, pp. 257–275.

Salisbury et al., "Interactive Pen–and–Ink Illustration," Computer Graphics Proceedings, Annual Conference Series, 1994, pp. 101–108.

Winkenbach, "Computer–Generated Pen–and–Ink Illustration," Computer Graphics Proceedings, Annual Conference Series, pp. 91–100.

Eliezer, "Color Screening Technology: A Tutorial on the Basic Issues," Seybold Report on Desktop Publishing, vol. 6, No. 2, Oct. 1991, 24 pgs.

Haeberli, "Paint by Numbers; Abstract Image Representations", Computer Graphics, vol. 24, Aug. 1990, 9 pages.

\* cited by examiner

Primary Examiner—William A. Cuchlinski, Jr.
Assistant Examiner—Thu Nguyen
(74) Attorney, Agent, or Firm—Fish & Richardson P.C.

(57) ABSTRACT

A technique of stroke substitution and digital halftoning uses prioritized textures to produce digital halftones which appear to be hand drawn in the traditional pen and ink fashion. A user may control geometric attributes of the halftone strokes and sampling parameters of the image, which allows for the creation of a wide variety of halftones.

31 Claims, 9 Drawing Sheets

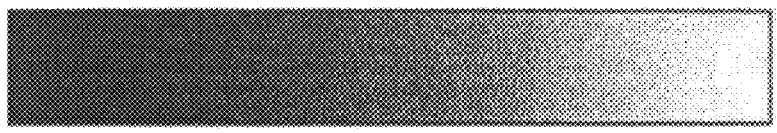
*FIG._1a*
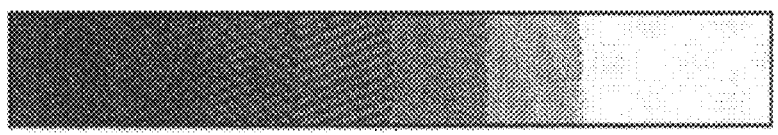
*FIG._1b*
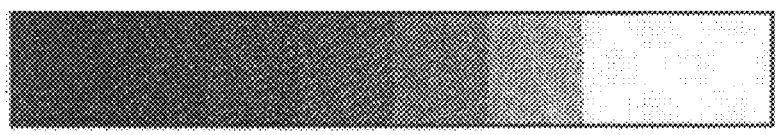
*FIG._1c*
*FIG._3*

FIG._2a
FIG._2b
FIG._2c
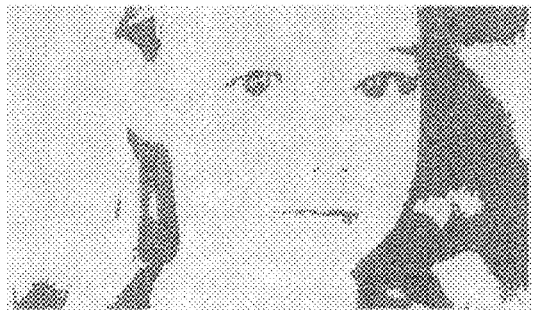
FIG._2d

FIG._2e
FIG._2f
FIG._2g
FIG._2h

FIG._4a
FIG._4b
FIG._4c
FIG._4d

FIG._4e
FIG._4f
FIG._4g
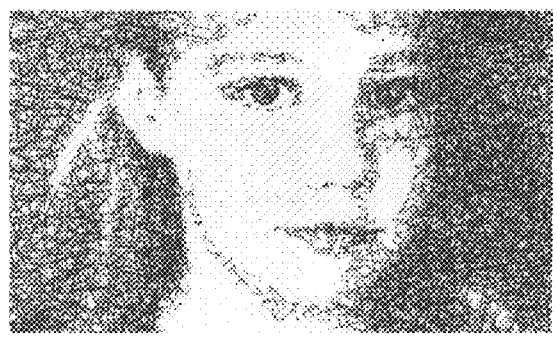
FIG._4h

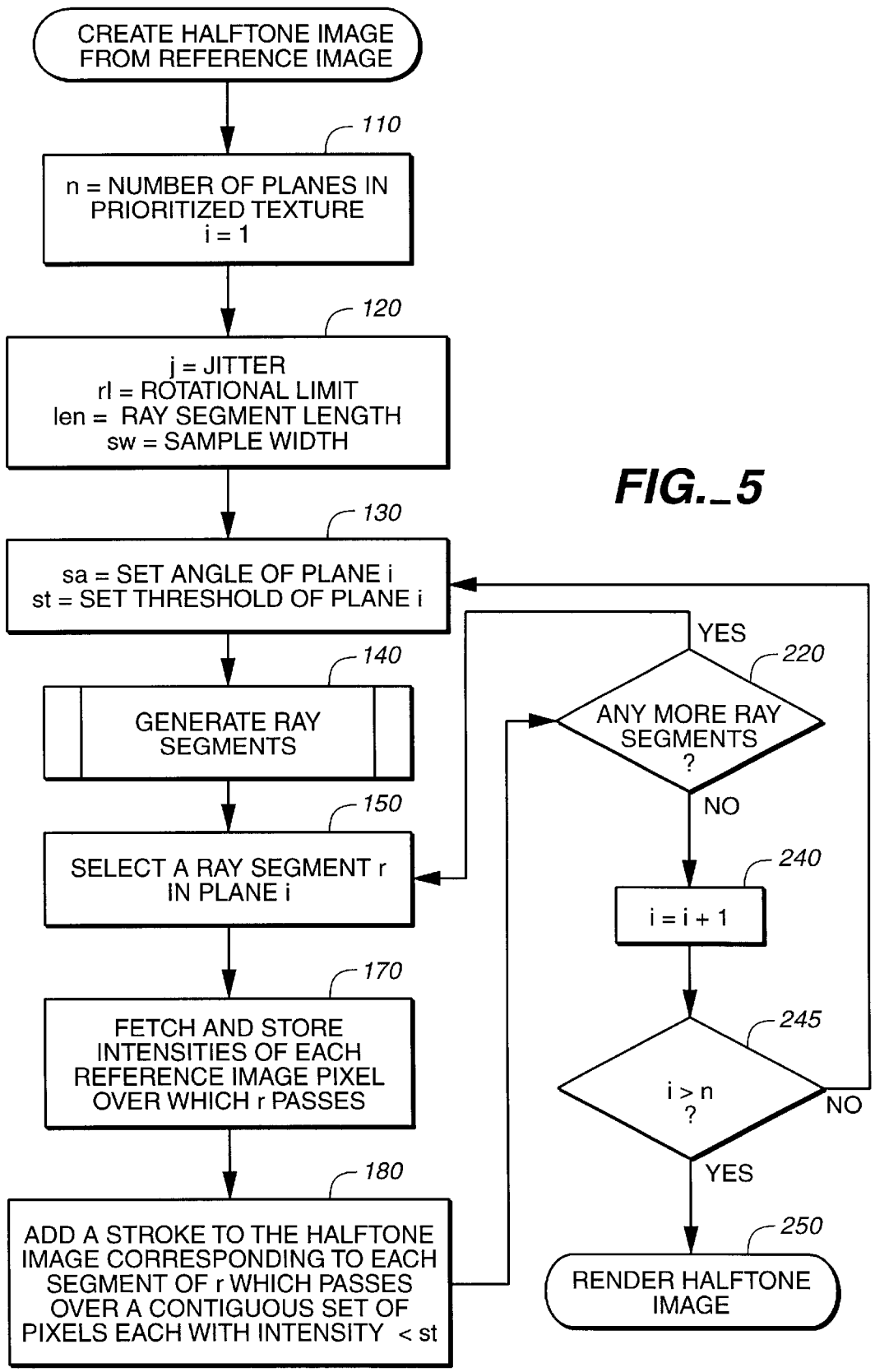
FIG._5

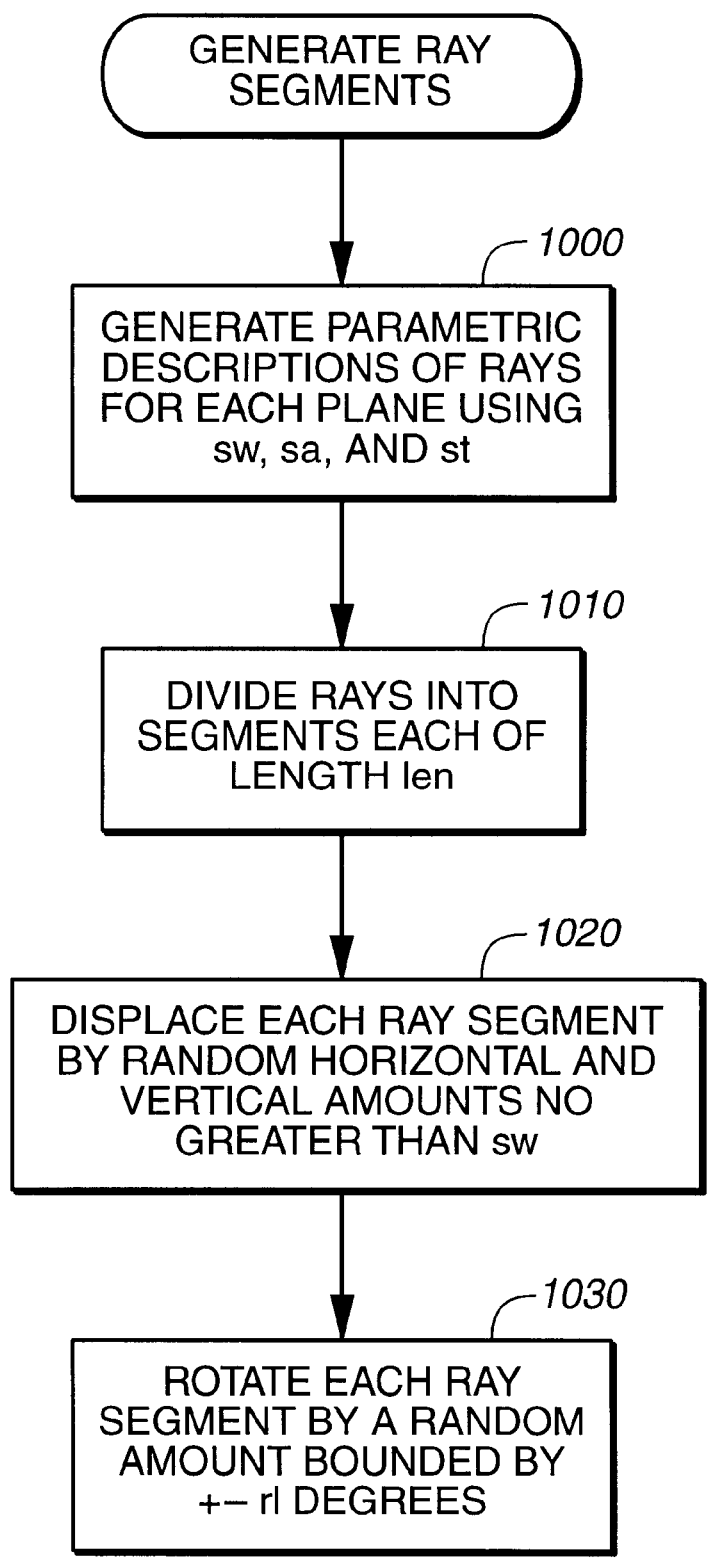
FIG._6

FIG._7

FIG._8

DIGITAL HALFTONING USING PRIORITIZED TEXTURES

CROSS REFERENCE TO RELATED APPLICATION

This application claims priority under 35 U.S.C. 119(e) from U.S. Provisional Patent Application Ser. No. 60/035, 504, filed on Jan. 15, 1997, which is hereby incorporated by reference.

BACKGROUND OF THE INVENTION

Digital halftoning is a branch of computer graphics whose origins date back to 1931. The history of digital halftoning is summarized in "Evolution of Halftoning Technology in the United States Patent Literature," Peter R. Jones, *Journal of Electronic Imaging*, Vol. 3, No. 3, 1994, pgs. 257–275.

In one form of halftoning, a continuous tone reference image is transformed into a binary image suitable for printing with black ink on white paper. This is accomplished by transformation of image intensities to areas containing black and white patterns. This process was first implemented by exposing a photograph through a piece of glass on which two sets of closely spaced parallel lines at ninety degrees to one another were etched. Dark areas of the photograph became large dots and light areas small dots when exposed through the screen.

Stroke substitution is a form of halftoning in which image intensities are replaced with strokes rather than with patterns of dots. Stroke substitution of a reference image was first introduced in 1987 in the ImagePaint product by ImageWare Research, from which the term "painterly effects" was coined. Paul Haeberli formalized and expanded on this concept in his paper, "Paint by Numbers: Abstract Image Representations," Proceedings SIGGRAPH '90, *Computer Graphics Annual Conference Series*, 1990, pgs. 207–214. Since that time stroke substitution has surfaced in many commercial paint and video effects systems. Stroke substitution involves replacing areas of a scanned image with areas that resemble strokes of paint, using colors derived from the reference image. Recently, the University of Washington has implemented digital pen and ink systems which use stroke substitution. "Scale-Dependent Reproduction of Pen-and-Ink Illustrations," Mike Salisbury et. al, Proceedings SIGGRAPH '96, *Computer Graphics Annual Conference Series*, 1996, pgs. 461–468; "Rendering Parametric Surfaces in Pen and Ink," Georges Winkenbach and David H. Salesin, Proceedings SIGGRAPH '96, *Computer Graphics Annual Conference Series*, 1996, pgs. 469–477; "Interactive Pen-and-Ink Illustration," Michael Salisbury et al., Proceedings SIGGRAPH '94, *Computer Graphics Annual Conference Series*, 1994, pgs. 101–108.

Prioritized textures were introduced in G. Winkenbach, D. H. Salesin, "Computer-Generated Pen-and-Ink Illustration," Proceedings SIGGRAPH '94, *Computer Graphics Annual Conference Series*, 1994, pgs. 91–100. A prioritized texture is a collection of strokes, each of which has a drawing priority. Prioritized textures are particularly useful for producing a range of tonal values resembling those present in pen and ink drawings. Light tones are represented by the strokes of the highest priority only. Darker tones are achieved by adding more strokes of lower priority. The darkest tones result when strokes of all priorities are present.

SUMMARY OF THE INVENTION

The invention relates to halftoning, specifically to the creation of digital halftones of continuous-tone digital images using prioritized textures.

In one aspect, the invention features a method for creating a halftone image from a reference image composed of pixels having intensity values, by constructing a prioritized texture consisting of a plurality of planes of rays, the planes of rays being associated with ranges of intensities, creating a spatial correspondence between rays in the planes of rays and the pixels in the reference image, and constructing strokes of the halftone image by adding to a set of display strokes portions of a ray in a plane of rays which correspond to one or more contiguous pixels in the reference image, the intensity values of which are within the range of intensities associated with the plane of rays. The display strokes may then be rasterized for output on a monitor, printer, or other output device. Prior to constructing strokes of the halftone image, a displacement amount determined by a displacement function may be generated for each ray.

Prior to constructing strokes of the halftone image, the rays may be divided into ray segments. For each of one or more of the ray segments, a rotational amount determined by a rotation function having an output representing a number of degrees may be generated. The output of the rotation function may be bounded by a predetermined amount. The output of the rotation function may be generated by a random or a pseudo-random process.

Each plane of rays may be associated with a set angle, the angle of one or more rays in a plane being about equal to the set angle associated with the plane. A displacement amount for a ray segment, determined by a displacement function, may be generated. Each plane may be associated with a sample width, each ray in a plane being separated from each adjacent ray by about the sample width associated with the plane. The displacement function may have a horizontal component and a vertical component, and the horizontal component and the vertical component may be bounded by the sample width associated with the plane of the ray segment.

In another aspect, the invention features a method for reducing moire in halftone images. In one embodiment, the invention distributes the set angles associated with the planes of rays to reduce moire, by reducing the number of set angles which differ from any other set angle by fewer than 30 degrees.

The invention's use of prioritized textures results in generation of halftones which resemble pen and ink drawings. Because the invention associates a single priority with all of the ray segments in each plane of a prioritized texture, the resulting halftones can resemble pen and ink drawings created by crosshatching a number of sets of parallel lines.

Operation of the invention is resolution independent and preserves reference image detail in several ways. First, although reference images are sampled using ray segments of a plane in a prioritized texture, the invention performs such sampling separately for each pixel that falls under a ray segment. Only those portions of a ray segment which pass over pixels with an intensity value less than the set threshold of the plane of the ray segment are retained in the resulting halftone image. In this way, reference image details which are smaller than the length of a ray segment are preserved. Furthermore, strokes in the halftone are stored in parametrized rather than rasterized form, providing resolution independent output of the halftone image. Because rasterization of the halftone image does not occur until the image is sent to an output device, the maximum resolution of the output device is used. Because jitter and rotation are applied prior to sampling of the reference image, reference image detail is not lost even though the prioritized textures with jitter and rotation applied may themselves be contain noise.

BRIEF DESCRIPTION OF THE DRAWINGS

FIGS. 1(a)–(c) are a series of bar pictorial views of a grayscale gradient and several halftones of the gradient.

FIGS. 2(a)–(h) shows a continuous tone reference image, a set of planes created from the reference image according to the invention, and the resulting halftone image.

FIG. 3 shows a halftone created according to the invention.

FIGS. 4(a)–(h) shows a series of halftones created according to the invention using different amounts of rotation and jitter.

FIG. 5 is a flow diagram of a computer-implemented process for creating a digital halftone image from a continuous tone reference image according to the invention.

FIG. 6 is a flow diagram of a computer-implemented process for creating the ray segments of a plane in a prioritized texture for use in the process shown in FIG. 5.

FIG. 7 shows a halftone whose sample width has been increased through magnification.

FIG. 8 shows a halftoned image produced using a process according to the invention.

DETAILED DESCRIPTION

A continuous tone grayscale reference image consists of a two-dimensional array of pixels, each pixel having an intensity or tone value ranging from a low value (black) to a high value (white). The highlight tone of the image is the tone in the image with the highest value. The near highlight tones are the tones in the image which approach the intensity of the highlight tone.

An art student may be instructed to begin creating a halftone from a reference image by drawing a series of somewhat closely spaced parallel strokes at the near highlight tones. As darker tones are required, a second set of parallel strokes are introduced at a fairly broad angle to the first. For yet darker tones, a third set of strokes is used. The rule of thumb is to repeat this process for up to six sets of strokes, yielding seven tones: the combination of the six sets of strokes plus the highlight tone (no strokes at all). FIG. 1(a) shows a continuous tone gray scale gradient 10. FIG. 1(b) shows how this gradient has been converted into crosshatching tones by creating several planes of parallel strokes and layering them to get progressively darker tones.

Similarly, a halftone image composed of strokes can be created by sampling a continuous tone reference image with a prioritized texture composed of six planes, where each plane contains a set of parallel rays, and where each plane has a priority associated with a threshold intensity, as described below.

FIG. 2(a) shows a scanned continuous tone grayscale reference image. FIGS. 2(b)–(g) are the individual planes of a halftone image generated by sampling the reference image with a prioritized texture. The halftone image resulting from the layering of the planes in FIGS. 2(b)–(g) is shown in FIG. 2(h).

A prioritized texture has a number of characteristics that may be represented by a number of parameters. The sample width associated with a plane in a prioritized texture is the distance between adjacent rays in the plane. The set angle associated with a prioritized texture is the angle of the rays in the plane. As can be seen in the halftone planes in FIGS. 2(b)–(g), each plane of the prioritized texture filters out pixels with an intensity value greater than a certain threshold intensity associated with the plane. This threshold intensity is referred to as the set threshold of the plane. The set thresholds and set angles for the planes of the prioritized texture used to create the halftone shown in FIG. 2(h) are given in Table 1.

TABLE 1

| Plane | FIG. | Set Threshold | Set Angle |
|---|---|---|---|
| 1 | 2 (b) | 32 | 20 |
| 2 | 2 (c) | 64 | 160 |
| 3 | 2 (d) | 96 | 60 |
| 4 | 2 (e) | 128 | 100 |
| 5 | 2 (f) | 160 | 120 |
| 6 | 2 (g) | 192 | 40 |

The line width of a plane of a halftone image is the width of each of the strokes in the plane. The mathematical relationship among the line widths, sample widths, and number of planes (n) of a halftone image can be approximated by Equation 1 for large values of n and well-distributed set angles, in which $sw_i$ is the sample width associated with a particular plane, and $lw_i$ is the line width of that plane. Sample width and line width may vary from plane to plane.

The perceived intensity of a single plane in a halftone image is given by the ratio of the line width ($lw_i$)

$$\sum_{i=1}^{n} lw_i / sw_i = 1 \qquad (1)$$

to the sample width ($sw_i$). The sum of all the perceived intensities should be 1 (black).

Although the halftone 370 shown in FIG. 2(h) is a good representation of the reference image, there is room for improvement. For example, a moire pattern generated by the interference of the planes can be seen in the alternating light and dark bands in the lower left corner of FIG. 2(h) and more clearly in the fourth tone from the left in FIG. 1(b). One way to improve the quality of the halftone is to reduce moire by adjusting the set angles associated with the planes of the prioritized texture used to create the halftone.

Referring to Table 1, one sees that the difference between the angle of the fourth and fifth planes is only twenty degrees. By switching the set angles associated with the planes of the prioritized texture to those of Table 2, below, one defers the inclusion of the narrow angles until the second tone from the left. Since there are several more planes interacting with this tone, the resulting moire is less noticeable than that resulting from the angles of Table 1. In general, moire can be reduced by reducing the number of set angles which differ from any other set angle by fewer than 30 degrees. When using a prioritized texture with six or fewer planes, this method can eliminate moire; otherwise, it can reduce but not eliminate moire.

TABLE 2

| Threshold | Angle |
|---|---|
| 32 | 100 |
| 64 | 20 |
| 96 | 80 |
| 128 | 160 |
| 160 | 120 |
| 192 | 40 |

The results of using these new angles can be seen in FIG. 1(c) and FIG. 3.

The gestural quality of images produced by the method described above is improved in several ways, as follows. First, the rays of each plane in the prioritized texture are divided into ray segments of a configurable ray segment length. Next, jitter is applied to each ray, prior to sampling of the reference image, by displacing each segment of a ray by a random displacement amount having a horizontal component and a vertical component. The value of each component is advantageously constrained to no more than the sample width associated with the plane. Alternatively, jitter may be applied to each ray prior to dividing the ray into ray segments by displacing each ray by a random amount in a direction perpendicular to the ray. In such a case, jitter displacement is advantageously constrained to no more than the sample width associated with the plane of the ray. Random rotations are then applied to each segment of each ray. The rotations may be bounded by a rotational limit expressed as ±n, where n is the maximum number of degrees of rotation to apply.

The incremental effects of jitter and rotation are shown in the halftones in FIG. 4, which were generated with the same angles as those in FIG. 2, in which moire effects were noticeable. However, moire is eliminated with a modest amount of jitter (FIG. 4(a)) or rotation (FIG. 4(f)). Only halftone FIG. 4(e), where the rotational variance is only +−4 degrees, shows any moire.

In one advantageous embodiment, a computer-implemented method is used to create a halftone image from a continuous tone reference image. The user is given control over parameters of the halftoning process, including the number of planes in the prioritized texture, and the set threshold and set angle for each plane. The user may also specify a single sample width and a single line width to use for all planes. The user is also given control over the ray segment length, the rotational limit, and degree of jitter. The user also specifies the reference image to be halftoned. Upon the user's request, the method shown in FIG. 5 may be executed to create a halftone image from the specified reference image.

Referring to FIG. 5, the method first sets a variable n equal to the number of planes in the prioritized texture (step 110). A local variable i, indicating the plane number of the prioritized texture plane currently being processed, is initialized (step 110). Next, variables for jitter (j), rotational limit (rl), ray segment length (len), and sample width (sw) are set in accordance with default or user-defined settings (step 120).

The main loop begins at step 130. First, the set angle (sa) and set threshold (st) of the current plane are stored in local variables (step 130). Next, the ray segments constituting the current plane of the prioritized texture are created using the method shown in FIG. 6 (step 140). The ray segments are stored in parametrized form (e.g., as vectors), rather than in rasterized form, making the process of sampling the reference image resolution independent.

Next, an inner loop is entered in which the reference image is sampled with each of the ray segments of the current plane of the prioritized texture (steps 150–220). First, a ray segment r in the current plane is selected (step 150). Next, the intensities of each reference image pixel over which r passes is fetched and stored (step 170). Then, a stroke is added to the halftone image corresponding to each portion of ray segment r which passes over a contiguous set of pixels each with an intensity less than the set threshold of the current plane (step 180). The strokes are stored in parametrized form, making the halftone image resolution independent. This process is repeated for each ray segment in the current plane (step 220).

The sampling process is repeated for each plane in the prioritized texture (steps 240, 245). After sampling is completed, the halftone image may be rendered on a monitor, printer, or other output device (step 250). To render the halftone image, each of the strokes of the image is rasterized using the appropriate line width and according to parameters appropriate for the output device.

Referring to FIG. 6, the ray segments of a plane of a prioritized texture are generated by first generating parametric descriptions of the rays in each plane using the default or user-specified sample width (sw) and the default or user-specified set angles (sa) and set thresholds (st) of each plane (step 1000). Next, each ray is divided into ray segments of length len (step 1010). Next jitter and rotation are applied to each ray segment (steps 1020, 1030). Jitter is applied by displacing each ray segment in a plane by a random amount horizontally and vertically (step 1020). The horizontal and vertical displacements are constrained to be no greater than half of the sample width associated with the plane. Rotation is applied by rotating each ray segment by a random number of degrees no greater than the rotational limit (rl) and no less than the negative of the rotational limit (step 1030).

Sample width and line width can be increased not only by directly modifying them but also by magnifying an image after it has been halftoned. FIG. 7 shows an image 800 that has been magnified by 200% after being halftoned with textures that mix jitter and rotation effects. This magnification produces very nearly the same effect as doubling the sample width and line width. However, using a magnification step is much faster than halftoning the larger image.

One result of the introduction of jitter and rotation is that the resulting halftones appear to have much more tonal resolution than they actually do. Even when working with only seven tones, the variation in texture of those tones gives the impression of many more. FIG. 8 shows this effect.

Other embodiments include, but are not limited to, the following. Prioritized textures with any number of planes may be used. The strokes in the planes of prioritized textures may be rays, ray segments, curved lines, curved line segments, or closed paths. Strokes in a plane of a prioritized texture may be non-uniformly spaced. Strokes in a plane of a prioritized texture may have varying angles.

Although elements of the invention are described in terms of a computer program implementation, the invention may be implemented in a computer program, general-purpose or special-purpose hardware, or firmware, or a combination of the three.

The present invention has been described in terms of an embodiment. The invention, however, is not limited to the embodiment depicted and described. Rather, the scope of the invention is defined by the following claims.

What is claimed is:

1. A computer-implemented method for creating a halftone image from a reference image composed of regions, each region having a respective intensity value, comprising:

providing a plurality of planes of rays, each of the planes of rays being associated with a respective range of intensities;

creating a spatial correspondence between rays in the planes of rays and the regions in the reference image; and adding to a set of display strokes each portion of each ray in each plane of rays which corresponds to a region in the reference image if the intensity value of the region is within the range of intensities associated with the respective corresponding plane of rays.

2. The method of claim 1, further comprising:

rasterizing the set of display strokes.

3. The method of claim 1, further comprising:

prior to constructing strokes of the halftone image, generating a displacement amount for a ray, determined by a displacement function.

4. The method of claim 1, further comprising:

prior to constructing strokes of the halftone image for one of the planes of rays, dividing its rays into ray segments.

5. The method of claim 4, further comprising:

for each of one or more of the ray segments, generating a rotational amount determined by a rotation function having an output representing a number of degrees.

6. The method of claim 5, wherein:

the output of the rotation function is bounded by a predetermined amount.

7. The method of claim 5, wherein:

the output of the rotation function is generated by a random or a pseudo-random process.

8. The method of claim 4, wherein:

each plane of rays is associated with a set angle, the angle of one or more rays in a plane being about equal to the set angle associated with the plane.

9. The method of claim 8, further comprising:

generating a displacement amount for a ray segment, determined by a displacement function.

10. The method of claim 9, wherein:

each plane is associated with a sample width, each ray in a plane being separated from each adjacent ray by about the sample width associated with the plane.

11. The method of claim 10, wherein:

the displacement amount has a horizontal component and a vertical component; and the horizontal component and the vertical component are bounded by the sample width associated with the plane of the ray segment.

12. The method of claim 8, further comprising:

distributing the set angles associated with the planes of rays to reduce moire.

13. The method of claim 12, wherein the distributing step comprises:

distributing the set angles associated with the planes of rays so that the number of pairs of planes of rays, consisting of a first plane and a second plane, for which the set angle associated with the first plane differs from the set angle associated with the second plane by fewer than about thirty degrees, is reduced.

14. The method of claim 12, wherein the distributing step comprises:

if the number of planes of rays is less than or equal to six, distributing the set angles associated with the planes of rays so that for the set angle associated with each first plane of rays, the set angle associated with each second plane of rays differs from the set angle associated with the first plane of rays by at least about thirty degrees; and if the number of planes of rays is greater than six, distributing the set angles associated with the planes of rays so that the number of pairs of planes of rays, consisting of a first plane and a second plane, for which the set angle associated with the first plane differs from the set angle associated with the second plane by fewer than about thirty degrees, is reduced.

15. The method of claim 12, wherein the distributing step comprises:

distributing the set angles associated with the planes of rays so that the number of pairs of planes of rays, consisting of a first plane and a second plane, for which the set angle associated with the first plane differs from the set angle associated with the second plane by fewer than about thirty degrees is reduced.

16. The method of claim 1, wherein each plane is associated with a sample width, each ray in a plane being separated from each adjacent ray by about the sample width associated with the plane, and further comprising:

distributing the set angles associated with the planes of rays to reduce moire, the angle of one or more rays in a plane of rays being about equal to the set angle associated with the plane of rays;

dividing each ray into ray segments;

displacing each ray segment by an amount determined by a displacement function;

rotating each ray segment by an amount determined by a rotation function having a pseudo-random output representing a number of degrees, the output of the rotation function being bounded by a predetermined amount;

constructing strokes of the halftone image by adding to a set of display strokes portions of a ray in a plane of rays which correspond to one or more contiguous pixels in the reference image, the intensity values of which are within the range of intensities associated with the plane of rays; and rasterizing the set of display strokes.

17. A computer program tangibly stored on a computer-readable medium and operable to cause a computer to create a halftone image from a reference image composed of regions having intensity values, comprising instructions to:

provide a plurality of planes of rays, the planes of rays being associated with ranges of intensities;

create a spatial correspondence between rays in the planes of rays and regions in the reference image; and adding to a set of display strokes each portion of each ray in each plane of rays which corresponds to a region in the reference image if the intensity value of the region is within the range of intensities associated with the respective corresponding plane of rays.

18. The computer program of claim 17, the computer program further comprising instructions to:

rasterize the set of display strokes.

19. The computer program of claim 17, the computer program further comprising instructions to:

prior to constructing strokes of the halftone image, generate a displacement amount for a ray, determined by a displacement function.

20. The computer program of claim 17, the computer program further comprising instructions to:

prior to constructing strokes of the halftone image for one of the planes of rays, divide its rays into ray segments.

21. The computer program of claim 20, the computer program further comprising instructions to:

for each of one or more of the ray segments, generate a rotational amount determined by a rotation function having an output representing a number of degrees.

22. The computer program of claim 21, wherein:

the output of the rotation function is bounded by a predetermined amount.

23. The computer program of claim 21, wherein:

the output of the rotation function is generated by a random or a pseudo-random process.

24. The computer program of claim 20, wherein:

each plane of rays is associated with a set angle, the angle of one or more rays in a plane being about equal to the set angle associated with the plane.

25. The computer program of claim 24, the computer program further comprising the steps of:

generating a displacement amount for a ray segment, determined by a displacement function.

26. The computer program of claim 25, wherein:

each plane is associated with a sample width, each ray in a plane being separated from each adjacent ray by about the sample width associated with the plane.

27. The computer program of claim 26, wherein:

the displacement amount has a horizontal component and a vertical component; and the horizontal component and the vertical component are bounded by the sample width associated with the plane of the ray segment.

28. The computer program of claim 24, the computer program further comprising instructions to:

distribute the set angles associated with the planes of rays to reduce moire.

29. The computer program of claim 28, wherein instructions to distribute the set angles associated with the planes of rays to reduce moire comprises instructions to:

distribute the set angles associated with the planes of rays so that the number of pairs of planes of rays, consisting of a first plane and a second plane, for which the set angle associated with the first plane differs from the set angle associated with the second plane by fewer than about thirty degrees, is reduced.

30. The computer program of claim 28, wherein the instructions to distribute the set angles associated with the planes of rays to reduce moire comprises instructions to:

if the number of planes of rays is less than or equal to six, distribute the set angles associated with the planes of rays so that for the set angle associated with each first plane of rays, the set angle associated with each second plane of rays differs from the set angle associated with the first plane of rays by at least about thirty degrees; and if the number of planes of rays is greater than six, distribute the set angles associated with the planes of rays so that the number of pairs of planes of rays, consisting of a first plane and a second plane, for which the set angle associated with the first plane differs from the set angle associated with the second plane by fewer than about thirty degrees, is reduced.

31. The computer program of claim 30, wherein the instructions to distribute the set angles associated with the planes of rays to reduce moire comprises instructions to:

distribute the set angles associated with the planes of rays so that the number of pairs of planes of rays, consisting of a first plane and a second plane, for which the set angle associated with the first plane differs from the set angle associated with the second plane by fewer than about thirty degrees is reduced.

* * * * *